A. Boynton,
Saw.

No. 2,695. Reissued Jul. 23. 1867.

Inventor;
A. Boynton
by his attys
Dodger & Munn

Witnesses;
P. J. Dodge
Geo. H. Geibel

United States Patent Office.

EBEN M. BOYNTON, OF GRAND RAPIDS, MICHIGAN, ASSIGNEE OF ALFRED BOYNTON.

*Letters Patent No.* 59,951, *dated November* 27, 1866; *reissue No.* 2,695, *dated July* 23, 1867.

IMPROVEMENT IN SAWS.

The Schedule referred to in these Letters Patent and making part of the same.

TO ALL WHOM IT MAY CONCERN:

Be it known that ALFRED BOYNTON, of the township of Wright, in the county of Ottawa, and State of Michigan, did invent certain new and useful improvements in the Construction of Saws; and I do hereby declare that the following is a full, clear, and exact description thereof, reference being had to the accompanying drawings, making part of this specification, and to the letters of reference marked thereon.

The invention consists in a novel method of constructing the teeth of saws, and forming a portion of the same to be cutting teeth, while a portion operate as gauges to regulate the cut, and also to act as clearers to remove the saw-dust as fast as formed by the cutting teeth.

Figure 1:
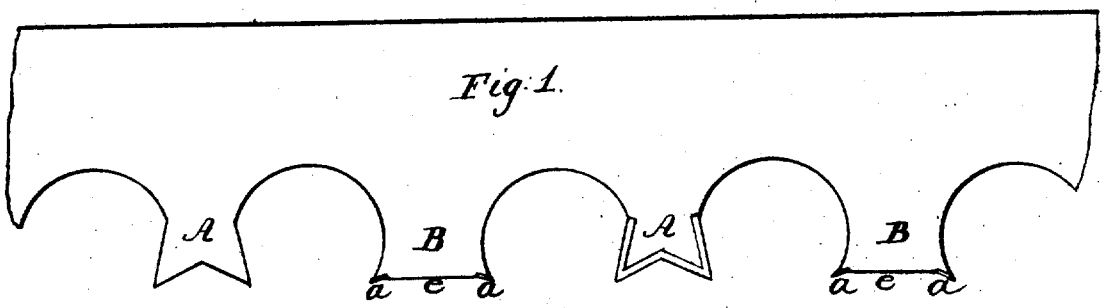
Figure 1 is a side view of a cross-cut saw made on my plan.
Figure 2:
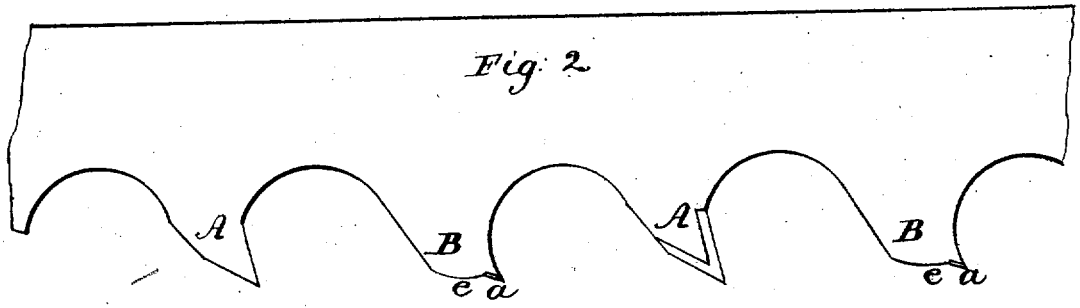
Figure 2 is a similar view of a saw intended for cutting in one direction only, constructed on the same plan.

I construct the improved saw with cutting teeth, A, of the usual form but with a considerable space between them and the adjoining teeth, as represented in the drawing. A portion of the teeth I construct as represented at B, these teeth being straight along their horizontal face, as represented at *e*, with a small tooth or point, *a*, formed at each extremity. These points *a* project slightly beyond the face *e*, and are filed bevelling equally each way from the centre on their under face. Their object or duty is to clear away the saw-dust formed by the cut of the teeth A directly in advance of the points *a*, removing the particles of saw-dust, and causing it to roll up into the space between them and the adjoining teeth A until it is carried out of the timber, when it falls clear of the saw. It will thus be seen that the dust cut by the preceding tooth or pair of teeth A is cleared away by the following clearer-tooth B, thus leaving a clear and unobstructed path for the cut of the succeeding cutting-tooth or teeth A. In fig. 2 the same construction of teeth is shown applied to a saw for cutting in one direction only. It is obvious that the number of clearer-teeth used may be more or less, in proportion to the number of cutting-teeth, as may be found most beneficial.

Having thus described the invention, what I claim, is—

A saw, provided with cutting-teeth A and clearer-teeth B, constructed and arranged substantially as described.

E. M. BOYNTON, *Assignee.*

Witnesses:

G. T. PENCE,

WM. G. BECKWITH.